United States Patent [19]

Gay et al.

[11] Patent Number: 4,852,710
[45] Date of Patent: Aug. 1, 1989

[54] CLUTCH RELEASE BEARING WITH BISTABLE SPRING WASHER

[75] Inventors: Christian Gay, Paris; Philippe Lassiaz, Boulogne, both of France

[73] Assignee: Valeo, Paris, France

[21] Appl. No.: 128,823

[22] Filed: Dec. 4, 1987

[30] Foreign Application Priority Data

Dec. 5, 1986 [FR] France .................................. 8617046

[51] Int. Cl.$^4$ ............................................. F16D 23/14
[52] U.S. Cl. ..................................... 192/98; 192/110 B; 384/612
[58] Field of Search .............. 192/98, 110 B; 384/495, 384/535, 611, 612, ; 267/161

[56] References Cited

U.S. PATENT DOCUMENTS

| 4,029,186 | 6/1977 | DeGennes | 192/98 |
| 4,608,741 | 9/1986 | Mallet | 29/450 |
| 4,637,506 | 1/1987 | Billet | 192/110 B |
| 4,643,286 | 2/1987 | Lassiaz | 192/98 |
| 4,739,867 | 4/1988 | Harrington | 192/98 |

FOREIGN PATENT DOCUMENTS

| 247400 | 12/1987 | European Pat. Off. | 192/98 |
| 2465120 | 4/1981 | France | 192/98 |
| 2544429 | 10/1984 | France . | |
| 2058276 | 4/1981 | United Kingdom . | |

*Primary Examiner*—Leslie A. Braun
*Assistant Examiner*—Richard M. Lorence
*Attorney, Agent, or Firm*—Charles E. Brown; Charles A. Brown

[57] ABSTRACT

A clutch release bearing comprises a maneuvering member operated on by a control member, usually a clutch release yoke. A drive member in direct or indirect axial bearing engagement with the maneuvering member, when operated on by the latter, operates on the clutch release device of a clutch. An axially acting spring washer of the Belleville spring type urges the drive member against the maneuvering member and retains the drive membering relative to the maneuvering member in the axial direction. This spring washer is able to turn inside out selectively so as to assume one or other of two separate stable configurations. One of these is a concave configuration and the other is a convex configuration. One configuration is an inoperative configuration and the other is an operative one. One peripheral edge of the spring washer bears axially on the drive member when it is in the operative configuration. On its other peripheral edge is a set of lugs through which it bears on the maneuvering member. The spring washer and these lugs form a dihedron. The maneuvering member includes a circumferential groove cooperating with the lugs. It has one flank serving as an abutment to the lugs in the inoperative configuration of the spring washer while its other flank supports the lugs in the operative configuration thereof. As a result, the dihedral angle between the lugs and the spring washer remains the same in both the operative and the inoperative configuration.

17 Claims, 3 Drawing Sheets

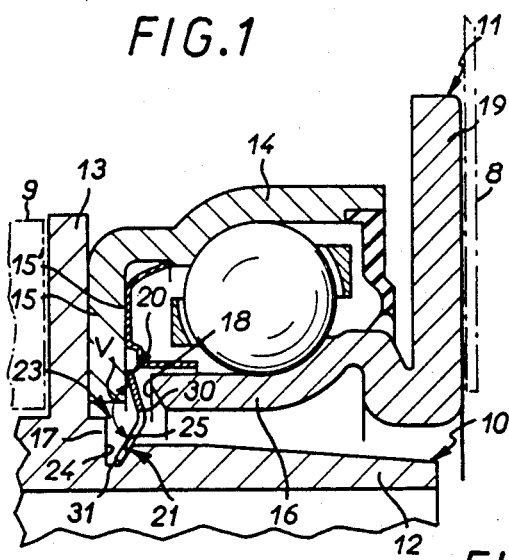
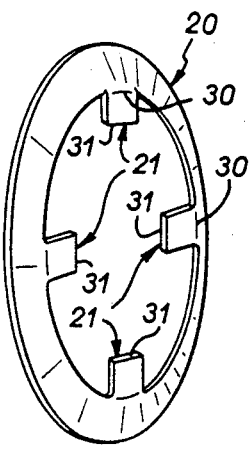
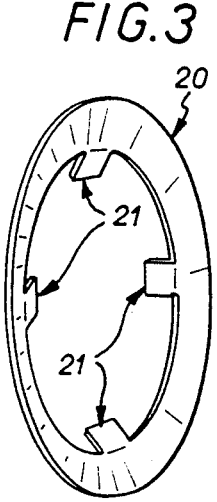
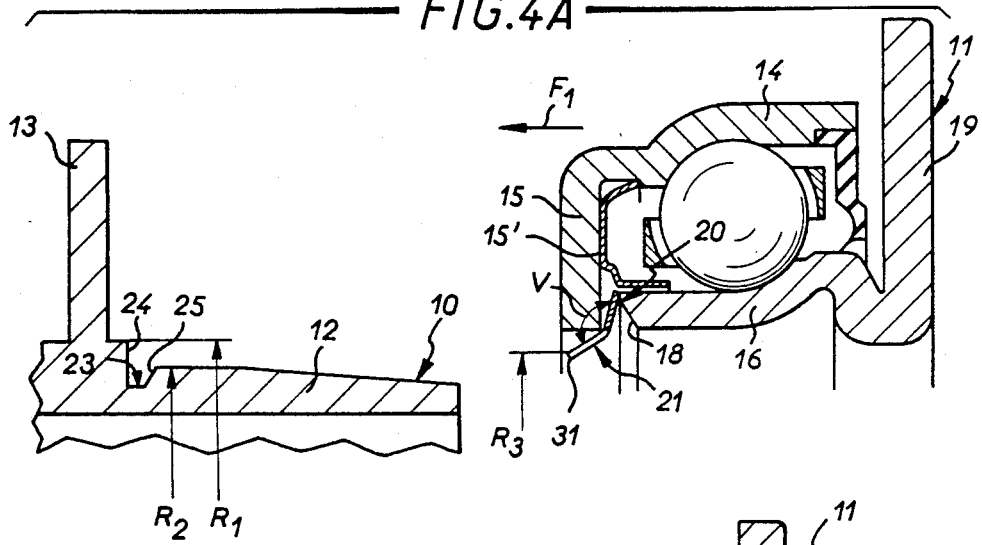
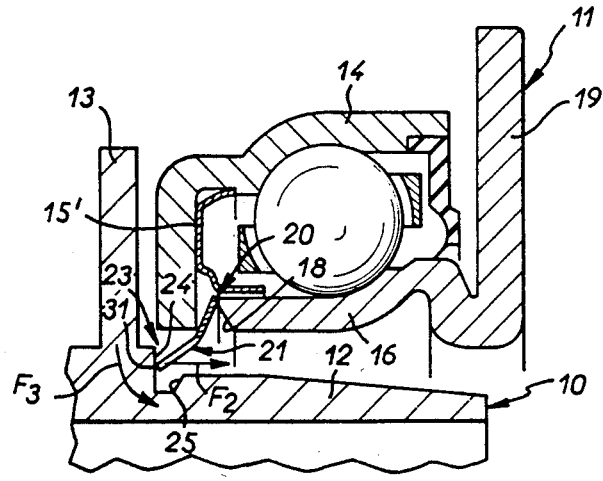

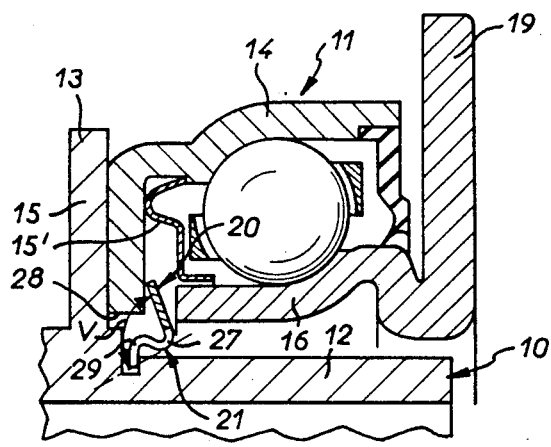
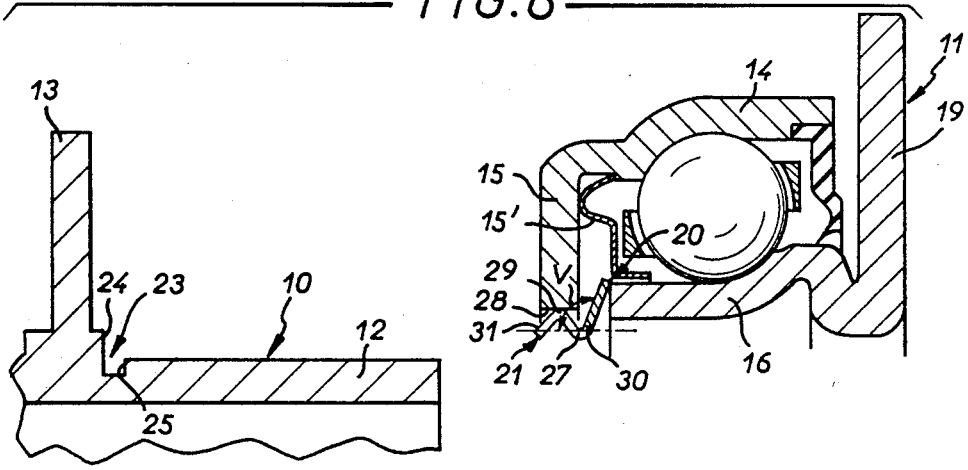
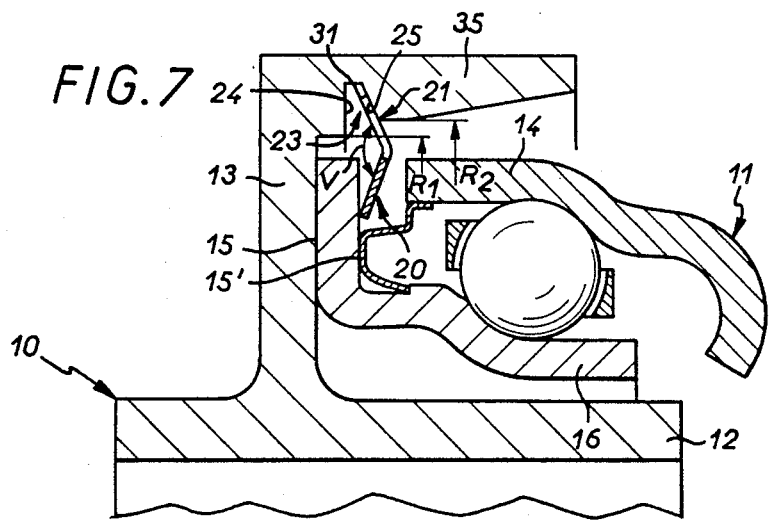

CLUTCH RELEASE BEARING WITH BISTABLE SPRING WASHER

BACKGROUND OF THE INVENTION

1. Field of the invention

The present invention is generally concerned with clutch release bearings of the type fitted to automobile vehicles, for example.

2. Description of the prior art

Known clutch release bearings generally comprise a maneuvering member which is adapted to be operated on by a control member, in practise a clutch release yoke, and a drive member in direct or indirect axial bearing engagement with the maneuvering member and which is adapted, when operated on by the latter, to operate on the clutch release device of a clutch.

The present invention is more particularly directed to the case where the drive member is urged axially against the maneuvering member by a bistable axially acting spring washer, in other words an axially acting spring washer adapted to turn inside out selectively so as to assume one or other of two separate stable configurations one of which is a concave configuration and the other of which is a convex configuration and one of which is an inoperative configuration and the other of which is an operative configuration, said concave and convex configurations being defined relative to the same axial observation direction.

A clutch release bearing of this type is described, for example in U.S. Pat. No. 4,608,741.

The spring washer used in it is adapted to have one of its peripheral edges bear axially on the drive member in the operative configuration and has on its other peripheral edge at least one lug through which it is adapted to bear against the maneuvering member.

In some at least of the embodiments envisaged, this lug is in a dihedral relationship to the remainder of the spring washer of which it forms part.

Being substantially rectilinear, for example, it is intended to be braced through the edge of one end against a shoulder on the maneuvering member with the concave side of the dihedron which it forms with the spring washer facing axially away from the side of the spring washer through which the latter bears axially on the drive member in the operative configuration.

In an alternative arrangement it is provided at its end with a right-angle lip and is intended to be hooked over the maneuvering member with the concave side of the dihedron that it forms with the spring washer facing axially towards the side of the spring washer through which the latter bears axially on the drive member in the operative configuration.

Such use of a bistable axially acting spring washer has the advantage of facilitating assembly: with the axially acting spring washer in the inoperative configuration within the drive member, of which it forms part from the outset of the assembly process, the drive member and the maneuvering member are engaged together axially and, on completion of such axial engagement, the spring washer goes of its own accord to the operative configuration with its lug or lugs braced against or hooked onto the maneuvering member.

The corresponding arrangement had proven and may yet prove satisfactory.

However, it has the disadvantage of leading to non-negligible mechanical stressing of the root area through which the lug or lugs on the Belleville spring washer merge with the remainder.

During assembly, the dihedral angle between the lugs and the spring washer changes value several times.

Taking the example of rectilinear lugs designed to be operative in braking, this angle is initially, in the inoperative configuration, considerably larger than 90°, being in practise near 180°. It is first reduced to a value of less than 90° during the first phase of relative engagement between the drive member and the maneuvering member. It then returns to a value greater than 90° when, at the end of such engagement, the spring washer turns inside out to assume the operative configuration.

The corresponding mechanical stresses may lead to fracture.

A general object of the present invention is an arrangement which makes it possible to avoid this disadvantage while making it possible to retain the advantage of assembly by simple relative axial interengagement of the drive member and the maneuvering member.

SUMMARY OF THE INVENTION

The present invention consists in a clutch release bearing comprising a maneuvering member adapted to be operated on by a control member, a drive member in direct or indirect axial bearing engagement with said maneuvering member and having a portion cooperable, when operated on by said maneuvering member, with the clutch release device of a clutch, and an axially acting spring washer of the Belleville spring type adapted to urge said drive member against said maneuvering member and to retain said drive member relative to said maneuvering member in the axial direction, wherein said spring washer is adapted to turn inside out selectively so as to assume one or other of two separate stable configurations one of which is a concave configuration and the other of which is a convex configuration and one of which is an inoperative configuration and the other of which is an operative configuration and has one peripheral edge adapted to bear axially on said drive member when it is in said operative configuration and on its other peripheral edge at least one lug by means of which it is adapted to bear on said maneuvering member, said at least one lug and said spring washer being in a dihedral relationship to each other, and wherein said maneuvering member comprises a circumferential groove adapted to cooperate with said at least one lug and having one flank adapted to serve as an abutment to said at least one lug for said inoperative configuration of said spring washer and its other flank adapted to support said at least one lug for said operative configuration of said spring washer, whereby the dihedral angle between said at least one lug and said spring washer may advantageously remain substantially the same for both of said configurations.

When the spring washer turns inside out from its inoperative configuration to its operative configuration there occurs a simple change in the orientation of the spring washer, from concave to convex or vice versa, but there is no significant change in the shape of the combination consisting of the spring washer and the lug or lugs with which it is provided.

This has the advantage of protecting the root area of the lug or lugs, as they are no longer stressed.

The characteristics and advantages of the invention will emerge from the following description given by way of example with reference to the appended schematic drawings.

BRIEF DESCRIPTION OF THE DRAWINGS

FIG. 1 is a partial view in axial cross-section of a clutch release bearing in accordance with the invention.

FIG. 2 is a perspective view of the axially acting spring washer that the clutch release bearing in accordance with the invention comprises, shown in the operative configuration.

FIG. 3 is a perspective view analogous to that of FIG. 2 showing the inoperative configuration of the axially acting spring washer.

FIGS. 4A and 4B are partial views in axial cross-section analogous to that of FIG. 1 showing two successive phases in the assembly of the clutch release bearing in accordance with the invention.

FIG. 5 is a partial view in axial cross-section analogous to that of FIG. 1 for an alternative embodiment.

FIG. 6 is a view analogous to that of FIG. 4A for this embodiment.

FIGS. 7 and 8 are partial views in axial cross-section analogous to that of FIG. 1 and relating to respective alternative embodiments.

DESCRIPTION OF THE PREFERRED EMBODIMENTS

Figure 8:
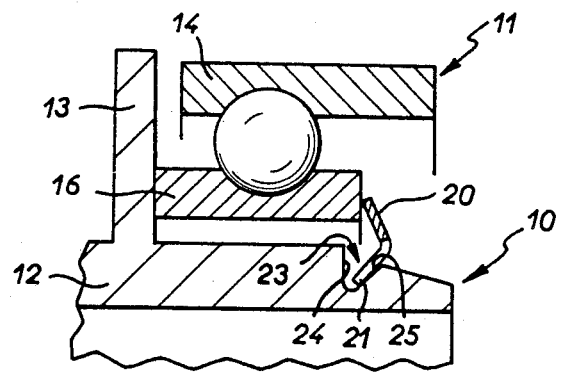

As shown in these figures, a clutch release bearing in accordance with the invention comprises a maneuvering member 10 which is adapted to be acted on by a control member 9, for example a clutch release yoke, and which is only partially visible in the figures, and a drive member 11 which is in direct or indirect axial bearing engagement against the maneuvering member 10 and which has a portion cooperable, when operated on by the latter, with the clutch release device 8 of a clutch, consisting of the ends of the fingers of a diaphragm spring, for example.

In a way that is known in itself the maneuvering member 10 comprises an axial sleeve 12 for fitting it onto some form of support and guide member (not shown). It further comprises a transverse flange 13 for the drive member 11 to bear on in the axial direction, extending annularly around the sleeve 12 and projecting away from its outside surface.

In the embodiment shown in FIGS. 1 through 4, and for reasons that will emerge hereinafter, the outside surface of the sleeve 12 is generally frustoconical over part at least of its length, diverging towards the flange 13 from the end opposite that flange.

The maneuvering member 10 may advantageously be molded from a synthetic material.

In a way that is also known in itself, the drive member 11 comprises a ball bearing one race of which is adapted to bear axially against the maneuvering member 10 while the other is the aforementioned portion cooperable with the clutch release device of the clutch to be controlled.

In the embodiments shown in FIGS. 1 through 6 it is the outer race 14 of this ball bearing which is adapted to bear against the maneuvering member 10, to be more precise against its flange 13, this outer race 14 itself comprising to this end an upstanding transverse edge 15 extending radially towards the axis of the assembly and through which it bears on the flange 13.

In these embodiments it is the inner race 16 of the ball bearing constituting the drive member 11 which is cooperable with the clutch release device of the clutch.

To this end it comprises at its free end an upstanding transverse edge 19 extending radially away from the axis of the assembly.

Alternatively, this free end could equally well have a rounded profile and/or be directed radially towards the axis of the assembly.

Axial bearing engagement between the drive member 11 and the maneuvering member 10 is obtained directly by direct contact between the upstanding edge 15 of the outer race 14 of the ball bearing constituting the drive member 11 and the transverse flange 13 of the maneuvering member 10.

As this clutch release bearing is in practise of the self-centering type, annular clearance is provided between the edge surface of the upstanding edge 15 of the drive member 11 and a rib 17 projecting radially from the outside surface of the sleeve 12 at the inside periphery of the flange 13 on the maneuvering member 10, where this flange 13 merges with the sleeve 12.

These arrangements are well known in themselves and as they do not of themselves relate to the object of the present invention they will not be described in more detail here.

In the embodiment shown in FIGS. 1 through 4 and for reasons that will emerge hereinafter the edge of the inner race 16 of the ball bearing constituting the drive member 11 facing towards the upstanding edge 15 of the outer race 14 is at least partially bevelled by a chamfer 18 on the side towards the axis of the assembly.

In a way that is also known per se an axially acting spring washer 20 of the Belleville spring type is used to urge the drive member 11 axially against the maneuvering member 10 and, as this is a clutch release bearing of the maintained self-centering type, to secure resilient control over such axial bearing engagement.

By virtue of arrangements of a similar kind to those described in the aforementioned U.S. Pat. No. 4,608,741, the spring washer 20 is a bistable spring washer by which is meant a spring washer which is adapted, by turning inside out, to assume selectively one or other of two stable configurations one of which is concave and the other of which is convex, while one of them is an inoperative configuration and the other of them is an operative configuration. In the operative configuration one of its peripheral edges bears axially on the drive member 11 and it has in one piece with it along its other peripheral edge at least one lug 21 through which it bears against the maneuvering element 10.

It is to be understood that the concave and convex configurations of the spring washer 20 are defined relative to the same axial observation direction.

This axial observation direction being, for example, that running from the upstanding edge 15 of the drive member 11 to the flange 13 of the maneuvering member 10, the spring washer 20 is concave in its inoperative configuration (FIG. 3) and convex in its operative configuration (FIG. 2).

The spring washer 20 being generally frustoconical, it is as if, on changing between its concave and convex stable configurations, on respective sides of a transverse plane passing through its inside edge, it turns inside out.

In the embodiments specifically shown in FIGS. 1 through 4, the spring washer 20 is designed to bear through its outside peripheral edge, that is to say its larger diameter peripheral edge, on the upstanding edge 15 of the drive member 11 when it is in its operative configuration and it is thus along its inside peripheral edge, that is to say its smaller diameter peripheral edge, that it features one or more lugs 21 through which it bears on the maneuvering member 10.

Four lugs 21 regularly distributed in the circumferential direction in pairs at 90° to each other are provided along the inside peripheral edge of the spring washer 20.

From their root area 30 to their ends 31 these lugs 21 are rectilinear.

Each lug 21 is at the same dihedral angle V as all the others to the spring washer 20.

In accordance with the invention, for the purpose of cooperation with the lugs 21 that the spring washer 20 thus features, the maneuvering member 10 comprises a circumferential groove 23 one flank of which is adapted, as will be explained later, to form an abutment for the lugs 21 in the inoperative configuration of the spring washer 20 whereas the other flank is adapted to support the lugs 21 in the operative configuration of the spring washer 20.

The flank of the groove 21 that is to form an abutment for the lugs 21 of the spring washer 20 in the inoperative configuration of the latter is the flank 24 facing axially towards the portion of the drive member 11 cooperable with the associated clutch release device, while the flank to provide a support for the lugs 21 in the operative configuration of the spring washer 20 is the flank 25 facing in the opposite axial direction, and thus in the direction away from the portion of the drive member 11 cooperable with the associated clutch release device.

In the embodiments shown in FIGS. 1 through 7, the groove 23 in the maneuvering member 10 is near the flange 13.

In the embodiment shown in FIGS. 1 through 4, the groove 23 is in the outside surface of the sleeve 12 of the operating member and extends annularly and continuously in the circumferential direction around the axis of the latter.

In the radial direction the groove 23 is substantially aligned with the upstanding edge 15 of the drive member 11.

Its flank 24, which is the one facing axially towards the portion of the drive member 11 cooperable with the associated clutch release device, is straight and it is axially offset towards the drive member 11 relative to the flange 13 of the maneuvering member 10.

This flank 24 delimits the rib 17 which is present at the root of the flange 13.

R1 denotes the radius of the circumference along which its outside edge runs.

In this embodiment, the other flank 25 of the groove 23 in the maneuvering member 10 intended to support the lugs 21 of the spring washer 20 in the operative configuration of the latter is inclined relative to the axis of the assembly, this flank 25 diverging from the flange 13 of said maneuvering member 10 as it moves away from said axis.

R2 denotes the radius of the circumference along which its outside edge runs.

In this embodiment, the radius R2 is less than the radius R1 and, for the inoperative configuration of the spring washer 20 (FIG. 4A), the free or drive ends 31 of the lugs 21 lie on a circumference whose radius R3 lies between these radii R1 and R2.

In other words, in this embodiment the flank 24 of the groove 23 in the maneuvering member 10 that faces axially towards the portion of the drive member 11 cooperable with the associated clutch release device extends radially beyond the ends 31 of the lugs 21 of the spring washer 20 when the latter is in the inoperative configuration whereas, in the radial direction, the other flank 25 terminates short of the ends 31 of the lugs 21.

The radius R3 of the circumference on which lie the free ends 31 of the lugs 21 of the spring washer may be substantially equal to the radius R2 of the circumference around which runs the outside edge of the flank 25 of the groove 23 in the maneuvering member 10.

In this embodiment the spring washer 20 is originally fitted to the drive member 11 (FIG. 4A), disposed axially between the upstanding edge 15 of the outer race 14 of the ball bearing constituting the drive member 11 and the corresponding edge of the inner race 16 of this ball bearing; it will therefore be readily understood that the chamfer 18 on this edge advantageously makes more room available at his location for the spring washer 20.

At this time the spring washer 20 is in the concave inoperative configuration and, as shown, bears on the inner race 16 of the ball bearing constituting the drive member 11.

In this inoperative configuration the lugs 21 on the spring washer 20 extend towards the maneuvering member 10 and, depending on its dimensions, the spring washer 20 is then centered either by virtue of its lugs 21 bearing on the upstanding edge 15 of the ball bearing constituting the drive member 11 or through contact of its outside peripheral edge with the deflector 15' usually fitted inside a ball bearing of this kind.

On relative axial engagement of the drive member 11 and the maneuvering member 10, favored by the frustoconical shape of the outside surface of the sleeve 12 of the latter, for example (as schematically represented by the arrow F1 in FIG. 4A) on axial engagement of the drive member 11 onto the maneuvering member 10, it is through the free ends 31 of the lugs 21 on the spring washer 20 that, by virtue of the geometrical arrangements already described, the drive member 11 comes axially into contact with the maneuvering member 10, the free ends 31 of the lugs 21 coming into abutting relationship with the flank 24 of the groove 23 in the maneuvering member 10 facing axially towards the drive member 11, before the upstanding edge 15 of the drive member 11 comes into contact with the flange 13 on the maneuvering member 10 (FIG. 4B).

Thus as axial engagement of the drive member with the maneuvering member 10 continues, the reaction force then exerted on the lugs 21 of the spring washer 20, as shown by the arrow F2 in FIG. 4B, the outside peripheral edge of the latter bearing against the edge of the inner race 16 of the drive member while its lugs are supported against the flank 24 of the groove 23 in the maneuvering member 10, is transmitted via the lugs 21 to the inside peripheral edge of the spring washer 20. Beyond a certain force, corresponding to a certain travel, the spring washer 20 suddenly turns inside out from its concave inoperative configuration to its convex operative configuration (FIG. 1).

At the same time, and as shown by the arrow F3 in FIG. 4B, the lugs 21 of the spring washer 20 rotate towards the axis of the assembly so that the spring washer 20 bears through the lugs 21 against the flank 25 of the groove 23 in the maneuvering member 10 while its outside peripheral edge bears axially against the upstanding edge 15 of the drive member 11 and so urges the latter elastically against the flange 13 of the maneuvering member 10.

On the change from the inoperative configuration of the spring washer 20 to its operative configuration, the combination that the spring washer 20 forms with the lugs 21 retains substantially the same shape, due to the presence of the groove 23 on the maneuvering member 10 and to the specific configuration of this groove 23, and also by virtue of the fact that, the free ends 31 of the lugs 21 then lying between the flanks 24 and 25 of the groove 23 in the radial direction and short of the outside edge of the radially larger flank (24) in the radial direction, the lugs 21 are already as it were pre-engaged in the groove 23.

Thus by virtue of the groove 23 in the maneuvering member 10 the dihedral angle V between the spring washer 20 and the lugs 21 thereof can advantageously remain substantially the same at all times and in particular may advantageously remain substantially the same in the inoperative and the operative configurations of the spring washer 20.

In the embodiment shown in FIGS. 5 and 6, each of the lugs 21 on the spring washer 20 features at least one elbow bend 29 and, in the inoperative configuration of the spring washer 20, bears on a cylindrical bearing surface 28 on the drive member 11 through this elbow bend 29.

This cylindrical bearing surface 28 is formed by the edge surface of the upstanding edge 15 of the drive member 11.

Each of the lugs 21 is generally S-shaped having in succession, beginning at the spring washer 20, two elbow bends 27 and 29 with their concave sides facing in opposite directions and it is through the second elbow bend 29, that farthest away from the spring washer 20, that in the inoperative configuration the lug 21 bears against the cylindrical bearing surface 24 on the drive member 11. The flank 25 of the groove 23 in the maneuvering member 10 which supports the lugs 21 on the spring washer 20 is straight and substantially perpendicular to the axis of the assembly.

Thus in this embodiment both the flanks 24 and 25 of the groove 23 are straight.

Taken overall, that is ignoring their elbow bends, the lugs 21 of the spring washer 20 are once again, as previously, at a dihedral angle V to the spring washer 20, this dihedral angle being measured, for example, relative to the line which joins their root area 30 to their free end 31.

Also as previously, when the spring washer 20 is in the inoperative configuration (FIG. 6) the lugs 21 extend towards the maneuvering member 10, each lug 21 then, taken as a whole, extending in a substantially axial direction. In this inoperative configuration the spring washer 20 is centered by the lugs 21, the elbow bends 29 of which bear against the cylindrical bearing surface 28 on the drive member 11 at this time, as already explained.

The drive member 11 is assembled with the maneuvering member 10 as previously and on completion of such assembly, after the spring washer 20 has turned inside out, the lugs 21 on the latter bear on the flank 25 of the groove 23 in the maneuvering member 10 without there being any significant change in the value of the dihedral angle V that they form with the spring washer 20.

In the embodiment shown in FIG. 7 it is through its outer race 14 that the ball bearing constituting the drive member 11 is cooperable with the clutch release device of a clutch and it is therefore its inner race 16 which has an upstanding edge 15 extending axially away from the axis of the assembly and through which it bears on the flange 13 of the maneuvering member 10.

The groove 23 which the maneuvering member 10 features to support the lugs 21 of the spring washer 20 is then on the inside surface of a ring 35 projecting axially from the outside edge of the flange 13 of the maneuvering member 10, parallel to and in the same direction as the sleeve 12 of the maneuvering member 10.

It is through its inside peripheral edge that the spring washer 20 is adapted to bear on the drive member 11, to be more precise on the upstanding edge 15 thereof, and it is therefore its outside peripheral edge that has at least one lug 21, in practise at least two lugs 21 appropriately distributed in the circumferential direction.

Thus four lugs 21 are provided at the outside peripheral edge of the spring washer 20, for example, as previously.

For the inoperative configuration of the spring washer 20 (not shown) the flank 24 of the groove 23 in the maneuvering member 20 which faces axially towards the portion of the drive member 11 cooperable with the associated clutch release device ends radially short of the free ends 31 of the lugs 21 of the spring washer 20 whereas the other flank 25 extends radially beyond said free ends 31.

In other respects the arrangements are of the same type as previously described.

In particular, the dihedral angle V that the lugs 21 form with the spring washer 20 advantageously remains substantially the same in both configurations of the spring washer 20, as previously.

Figure 9:
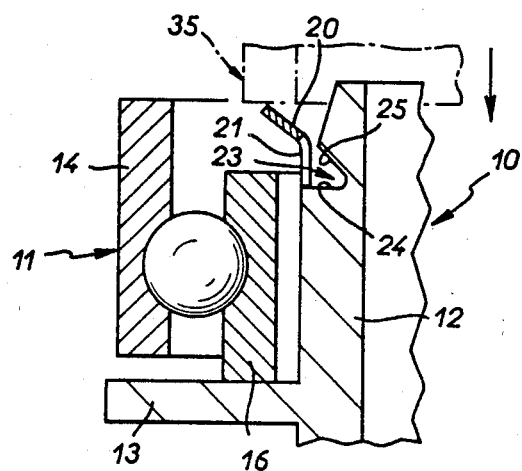
FIG. 9 is a partial view in axial cross-section showing how the FIG. 8 embodiment is assembled.

In the embodiment shown in FIGS. 8 and 9, the groove 23 in the maneuvering member 10 is once again in the outside surface of the sleeve 12 thereof but, instead of being near the flange 13, it is near the free end of the sleeve opposite the flange, on the side towards the portion of the drive member 11 cooperable with the clutch control device and the spring washer 20 bears on the side of the drive member 11 facing away from the flange 13.

The inner race 16 of the ball bearing constituting the drive member 11 bears on the flange 13 of the maneuvering member 10 and it is therefore through the outer race 14 of this ball bearing, appropriately extended and/or shaped to this end, that the drive member 11 is cooperable with the clutch release device of a clutch.

It goes without saying, however, that the converse arrangement can be adopted, as previously.

The flank 24 of the groove 23 which is axially nearer the flange 13 and is adapted to serve as an abutment for the lugs 21 on the spring washer 20 in the inoperative configuration of the latter faces axially towards the portion of the drive member 11 cooperable with the associated clutch release device, as previously.

Also as previously, this flank is straight.

The flank 25 of the groove 23, that axially farthest away from the flange 13 and adapted to support the lugs 21 of the spring washer 20 in the operative configuration of the latter, faces in the opposite axial direction and thus, as previously, in the direction away from the portion of the drive member 11 cooperable with the associated clutch release device.

This flank is inclined to the axis of the assembly, the lugs 21 of the spring washer 20 being rectilinear in this embodiment, as in those described with reference to FIGS. 1 through 4 and 7, forming a dihedron with the spring washer 20.

The inner race 16 of the ball bearing constituting the drive member 11 is generally cylindrical and the spring washer 20 bears on its edge facing away from the flange 13 of the maneuvering member 10.

The outer race 14 of this ball bearing is also generally cylindrical.

It will therefore be noted that this embodiment has the advantage of being very simple to manufacture.

To assemble it, as shown in FIG. 9, the maneuvering member 10 may be disposed vertically and there are then fitted axially onto the maneuvering member 10 first the drive member 11, until it butts up against the flange 13, and then the spring washer 20, at this stage independent of the ball bearing constituting the drive member 11, until the lugs 21 thereof butt up against the straight flank 24 of the groove 23 in the sleeve 12.

It is then sufficient, using a cylindrical tool 35 as schematically represented in chain-dotted outline in FIG. 9, to cause the spring washer 20 suddenly to turn inside out.

Once this has been done, the spring washer 20 is applied against the edge of the inner race 16 of the ball bearing constituting the drive member 11 while, as previously, its lugs 21 bear on the inclined flank 25 of the groove 23 in the maneuvering member 10.

Figure 10:
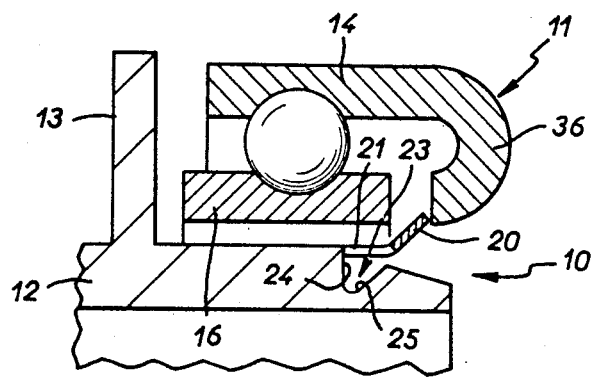
FIG. 10 is a partial view in axial cross-section analogous to that of FIG. 8 for another embodiment.

In the embodiment shown in FIG. 10 the outer race 14 of the ball bearing constituting the drive member 11 is shaped at the end through which it is cooperable with the clutch release device of a clutch.

The resulting curved part 36 of the outer race 14 may then serve to secure the sudden turning inside out of the spring washer 20 during assembly.

In this case the spring washer 20 is fitted in advance to the corresponding ball bearing, as in the embodiments of FIGS. 1 through 7.

It will be noted that in all the embodiments described and shown the concave side of the dihedron formed by the spring washer 20 and its lugs 21 faces towards the side of the spring washer 20 through which, in the operative configuration, the latter bears axially on the drive member 11.

In all cases the lugs 21 of the spring washer advantageously bear through one of their surfaces, and not through their end, against the maneuvering member 10.

It is to be understood that the present invention is not limited to the embodiments described and shown but encompasses any variant execution and/or combination of their various component parts.

In particular, the groove in the maneuvering member need not necessarily be circumferentially continuous.

To the contrary, it may be circumferentially discontinuous in which case indexing means are provided between the maneuvering member and the spring washer so that the lugs on the latter are correctly lined up with the corresponding sections of a groove of this kind.

Also, the peripheral edge of the spring washer opposite that carrying the lugs may be crenelated to a greater or lesser degree and may even feature circumferentially distributed lugs.

Finally, in the embodiments shown in FIGS. 1 through 7 the spring washer is not necessarily fitted in advance to the drive member especially when, there being sufficient annular space between the sleeve of the maneuvering member and the inner race of the ball bearing constituting the drive member, it is possible to use a tool to push the spring washer axially when, already fitted to said maneuvering member, said drive member is already butted up against the flange of the latter.

There is claimed:

1. A clutch release bearing comprising a maneuvering member adapted to be operated on by a control member, said clutch release bearing having an axis, a drive member in direct or indirect axial bearing engagement wit said maneuvering member and having a portion cooperable, when operated on by said maneuvering member, with a clutch release device, and a Belleville type axially acting spring washer for urging said drive member against said maneuvering member and retaining in the axial direction said drive member relative to said maneuvering member, said spring washer being selectively movable between respective operative and inoperative stable configurations, one of the configurations being concave and the other being a convex configuration, one peripheral edge of said spring washer bearing axially on said drive member in the operative configuration and another peripheral edge of said spring washer having at least one lug for bearing on said maneuvering member, said at least one lug defining a dihedral angle with the rest of said spring washer, said maneuvering member including a circumferential groove cooperable with said at least one lug, said groove having one flank defining an abutment for said at least one lug in the inoperative configuration of said spring washer and another flank for supporting said at least one lug in the operative configuration of said spring washer, the dihedral angle being substantially the same for both of said spring washer configurations.

2. The clutch release bearing according to claim 1, wherein the dihedral angle faces axially towards a portion of said drive member against which said one peripheral edge bears.

3. The clutch release bearing according to claim 1, wherein, in the inoperative configuration of said spring washer, a free end of said at least one lug lies on a circumference having a radius in between the radii of the circumferences along which lie respective outside edges of the flanks of said groove in said maneuvering member.

4. The clutch release bearing according to claim 1, wherein, in the operative configuration, said spring washer bears on said drive member through its outside peripheral edge and said at least one lug is on its inside peripheral edge and, for the inoperative configuration of said spring washer, the flank of said groove in said maneuvering member facing axially towards the portion of said drive member cooperable with the clutch control device extends, with respect to said axis, radially beyond the free end of said at least one lug and the other flank thereof terminates radially short of said free end.

5. The clutch release bearing according to claim 1, wherein, in the operative configuration, said spring washer bears on said drive member through its outside peripheral edge and has said at least one lug on its inside peripheral edge and, for the inoperative configuration of said spring washer, the flank of said groove in said maneuvering member facing axially towards said drive member extends, with respect to said axis, radially beyond the free end of said at least one lug and the other flank thereof terminates radially short of said free end.

6. The clutch release bearing according to claim 1, wherein said one flank of said circumferential groove faces axially towards said drive member and said other flank faces axially away from said drive member.

7. The clutch release bearing according to claim 1, wherein said at least one lug of said spring washer incorporates at least one elbow bend and, for said inoperative configuration of said spring washer, said at least one elbow bend of said at least one lug bears on a cylindrical bearing surface of said drive member.

8. The clutch release bearing according to claim 7, wherein, said at least one lug of said spring washer has a generally S-shaped configuration comprising in succession, starting from the rest of the said spring washer, two elbow bends with concave sides facing in opposite directions and an elbow bend farthest from said spring washer bearing on a cylindrical bearing surface on said drive member in the inoperative configuration.

9. The clutch release bearing according to claim 3, wherein, in the inoperative configuration of the said spring washer, the radius of said circumference on which the free end of said at least one lug lies is substantially equal to the radius of the circumference along which lies the outside edge of the flank of said groove in said operating member facing axially away from the portion of said drive member cooperable with the clutch control device.

10. The clutch release bearing according to claim 3, wherein, in the operative configuration of said spring washer, the radius of said circumference on which the free end of said at least one lug lies is substantially equal to the radius of the circumference along which lies the outside edge of the flank of said groove in said operating member facing axially away from said drive member.

11. A clutch release bearing comprising a maneuvering member adapted to be operated on by a control member, said clutch release bearing having an axis, a drive member in direct or indirect axial bearing engagement with said maneuvering member, and having a portion cooperable, when operated on by said maneuvering member with a clutch release device, and a Belleville type axially acting spring washer for urging said drive member against said maneuvering member and retaining in the axial direction said drive member relative to said maneuvering member, said spring washer being selectively movable between respective operative and inoperative stable configurations, one of the configurations being concave and the other being a convex configuration, one peripheral edge of said spring washer bearing axially on said drive member in the operative configuration and an other peripheral edge of said spring washer having at least one lug for bearing on said maneuvering member, said at least one lug defining a dihedral angle with the rest of said spring washer, said maneuvering member including a circumferential groove cooperable with said at least one lug, said groove having one flank defining an abutment for said at least one lug in the inoperative configuration of said spring washer and another flank for supporting said at least one lug in said operative configuration of said spring washer, the dihedral angle being substantially the same for both of said spring washer configurations said one flank of said circumferential groove defining an abutment in said inoperative configuration of said spring washer faces axially towards the portion of said drive member cooperable with the clutch release device and said other flank supporting said at least one lug for said operative configuration of spring washer faces axially away from the portion of said drive member cooperable with the clutch release device.

12. The clutch release bearing according to claim 11, wherein, said maneuvering member has a transverse flange and an axial sleeve and said drive member has an upstanding edge for bearing axially against said flange of said maneuvering member and, one peripheral edge of said spring washer bearing axially against said upstanding edge of said drive member in the operative configuration, said groove in said maneuvering member being in the outside surface of said sleeve and substantially radially aligned with said upstanding edge of said drive member.

13. The clutch release bearing according to claim 11, wherein, said maneuvering member comprises a transverse flange, a ring projecting axially from an outside peripheral edge of said flange of said maneuvering member, and the inside peripheral edge of said spring washer bearing on said drive member and the outside peripheral edge of said spring washer having said at least one lug, said groove in said maneuvering member being on the inside surface of said ring and, in the inoperative configuration of said spring washer, the flank of said groove in said maneuvering member facing axially towards the portion of said drive member cooperable with said clutch release device terminating, with respect to said axis, radially short of a free end of said at least one lug while the other flank extends radially beyond said free end.

14. The clutch release bearing according to claim 11, wherein, said at least one lug of said spring washer incorporates at least one elbow bend and, for the inoperative configuration of said spring washer, said at least one elbow bend of said at least one lug bears on as cylindrical bearing surface of said drive member.

15. The clutch release bearing according to claim 11, wherein, the inside peripheral edge of said spring washer bears on said drive member and the outside peripheral edge has said at least one lug and said groove in said maneuvering member being on the inside surface of a ring projecting axially from an outside peripheral edge of a transverse flange of said maneuvering member and, in the inoperative configuration of said spring washer, the flank of said groove in said maneuvering member facing axially towards said drive member terminates, with respect to said axis, radially short of a free end of said at least one lug while the other flank extends radially beyond said free end.

16. A clutch release bearing comprising a maneuvering member adapted to be operated on by a control member, said clutch release bearing having an axis, a drive member in direct or indirect axial bearing engagement with said maneuvering member and having a portion cooperable, when operated on by said maneuvering member, with a clutch release device, and a Belleville type axially acting spring washer for urging said drive member against said maneuvering member and retaining in the axial direction said drive member relative to said maneuvering member, said spring washer being selectively movable between respective operative and inoperative stable configurations, one of the configurations being concave and the other being a convex configuration, one peripheral edge of said spring washer bearing axially on said drive member in said operative configuration and an other peripheral edge of said spring washer having at least one lug for bearing on said maneuvering member, said at least one lug defining a dihedral angle with the rest of said spring washer, said maneuvering member including a circumferential groove cooperable with said at least one lug, said groove having one flank defining an abutment for said at least one lug in the inoperative configuration of said spring washer and another flank for supporting said at least one lug in the operative configuration of said spring washer, the dihedral angle being substantially the same for both of said spring washer configurations, said at least one lug of said spring washer being substantially rectilinear, said maneuvering member having a transverse flange against which said drive member bears axially and said other flank of said groove being inclined to the axis of the clutch release bearing, said flank diverging from said flange of said maneuvering member as it diverges from the other flank of said groove.

17. A clutch release bearing comprising a maneuvering member adapted to be operated on by a control member, said clutch release bearing having an axis, a drive member in direct or indirect axial bearing engagement with said maneuvering member and having a portion cooperable, when operated on by said maneuvering member, with a clutch release device, and a Belleville type axially acting spring washer for urging said drive member against said maneuvering member and retaining in the axial direction said drive member relative to said maneuvering member, said spring washer being selectively movable between respective operative and inoperative stable configurations, one of the configurations being concave and the other being a convex configuration, one peripheral edge of said spring washer bearing axially on said drive member in the operative configuration and an other peripheral edge of said spring washer having at least one lug for bearing on said maneuvering member, said at least one lug defining a dihedral angle with the rest of said spring washer, said at least one lug having opposed main faces said maneuvering member including a circumferential groove cooperable with said at least one lug, said groove having one flank defining an abutment for said at least one lug in the inoperative configuration of said spring washer and another flank cooperable with said at least one lug in the operative configuration of said spring washer, one of the faces of said at least one lug bearing flush against said one flank in the operative configuration of said spring washer, the dihedral angle being substantially the same for both of said spring washer configurations.

* * * * *